US009313786B2

(12) United States Patent
Diener et al.

(10) Patent No.: US 9,313,786 B2
(45) Date of Patent: *Apr. 12, 2016

(54) DYNAMICALLY DEDICATED WIRELESS LOCAL AREA NETWORK SERVICE FOR HIGH DEFINITION VIDEO TELECONFERENCING

(75) Inventors: Neil Robert Diener, Hudson, OH (US); Abhijit Kumar Choudhury, Cupertino, CA (US); Brian Donald Hart, Sunnyvale, CA (US); David S. Stephenson, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 182 days.

This patent is subject to a terminal disclaimer.

(21) Appl. No.: 13/618,299

(22) Filed: Sep. 14, 2012

(65) Prior Publication Data

US 2013/0010731 A1    Jan. 10, 2013

Related U.S. Application Data

(63) Continuation of application No. 12/511,378, filed on Jul. 29, 2009, now Pat. No. 8,325,696.

(51) Int. Cl.
| | |
|---|---|
| H04W 4/00 | (2009.01) |
| H04W 72/04 | (2009.01) |
| H04N 7/14 | (2006.01) |
| H04B 7/212 | (2006.01) |
| H04J 1/00 | (2006.01) |
| H04W 72/08 | (2009.01) |

(52) U.S. Cl.
CPC ........... *H04W 72/0453* (2013.01); *H04N 7/148* (2013.01); *H04W 72/082* (2013.01)

(58) Field of Classification Search
None
See application file for complete search history.

(56) References Cited

U.S. PATENT DOCUMENTS

| | | | |
|---|---|---|---|
| 7,382,756 B2 | 6/2008 | Barber et al. | |
| 7,747,272 B2 | 6/2010 | Parsa | |
| 7,801,038 B2 | 9/2010 | Liao et al. | |
| 2003/0012217 A1* | 1/2003 | Andersson et al. | 370/437 |
| 2005/0060319 A1* | 3/2005 | Douglas et al. | 707/10 |
| 2008/0045223 A1* | 2/2008 | Goto et al. | 455/442 |
| 2008/0049703 A1* | 2/2008 | Kneckt et al. | 370/342 |
| 2009/0323608 A1* | 12/2009 | Adachi et al. | 370/329 |

* cited by examiner

*Primary Examiner* — Ayaz Sheikh
*Assistant Examiner* — Sori Aga
(74) *Attorney, Agent, or Firm* — Patterson & Sheridan, LLP

(57) ABSTRACT

In an example embodiment described herein is an apparatus comprising a wireless transceiver and channel selection logic coupled to the wireless transceiver and operable to select an operating frequency for the wireless transceiver. The channel selection logic is configured to reserve a dedicated channel having a special identifier. The channel selection logic is configured to have the wireless transceiver advertise the dedicated service on a normal operating frequency. The channel selection logic is responsive to receiving a request from a wireless device via the wireless transceiver on the normal operating frequency to use the dedicated channel to switch to the dedicated channel and establish communications with the wireless device on the dedicated channel.

25 Claims, 3 Drawing Sheets

US 9,313,786 B2

DYNAMICALLY DEDICATED WIRELESS LOCAL AREA NETWORK SERVICE FOR HIGH DEFINITION VIDEO TELECONFERENCING

CROSS REFERENCE TO RELATED APPLICATIONS

This application is a continuation of U.S. patent application Ser. No. 12/511,378, filed Jul. 29, 2009 now U.S. Pat. No. 8,325,696.

TECHNICAL FIELD

The present disclosure relates generally to wireless communications.

BACKGROUND

There is a growing demand for high definition video teleconferencing systems. For some implementations, it is desirable for one or both of the endpoints of a video teleconference to be mobile. For example, a car company may desire a mobile video teleconferencing unit that can be moved around a large manufacturing floor so that remote experts can confer with local personnel and diagnose manufacturing issues. As another example, a hospital may want to employ a mobile video teleconferencing unit that can be brought into a patient's room so a remote physician can provide consultation.

For mobile video teleconferencing, a wireless local area network (WLAN) connection may be desirable. But video teleconferencing may have challenging end to end network requirements for bandwidth (for example 10-30 Mbps), latency (such as 150 ms), jitter (e.g. 10 ms), and packet loss (which may need to be 0.05% or less), which are hard to meet when the access medium is shared with other endpoints. One possible solution is to provide a set of access points (APs) dedicated to video teleconferencing; however, this solution can be very expensive to implement and may be excessive where the desired use is for a small number units which may be used a small amount of time.

BRIEF DESCRIPTION OF THE DRAWINGS

The accompanying drawings incorporated herein and forming a part of the specification illustrate the examples embodiments.

OVERVIEW OF EXAMPLE EMBODIMENTS

Figure 1:
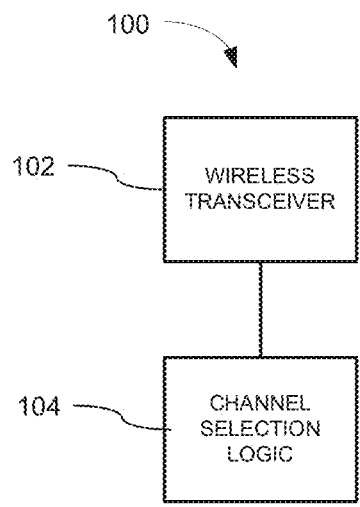
FIG. 1 illustrates an example of an apparatus configured to implement an example embodiment.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein an apparatus comprising a wireless transceiver and channel selection logic coupled to the wireless transceiver and operable to select an operating frequency for the wireless transceiver, The channel selection logic is configured to reserve a dedicated channel for dedicated service having a special identifier. The channel selection logic is configured to have the wireless transceiver advertise the dedicated service on a normal operating frequency. The channel selection logic is responsive to receiving a request from a wireless device for the dedicated service via the wireless transceiver on the normal operating frequency and to switch to the dedicated channel and establish communications with the wireless device on the dedicated channel.

In accordance with an example embodiment, there is disclosed herein a method, comprising advertising on a first channel, a first service set identifier associated with the first channel and a second service set identifier associated with a second channel. An association request is received from a client for the second service set identifier. The client is associates with the second service set identifier, and switches to the second channel responsive to associating with the second service set identifier.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

In an example embodiment, a single set of Wireless Local Area Network (WLAN) infrastructure nodes are deployed that support both normal traffic and high bandwidth traffic (such as videoconferencing traffic, for example CISCO TELEPRESENCE available from Cisco Systems, Inc., 170 West Tasman Drive, San Jose, Calif. 95134, which may also be referred to hereinafter as "Telepresence"). When a high bandwidth (such as Telepresence) session is to be supported over a WLAN, an access point (AP) is dynamically assigned to be dedicated to the high bandwidth session, using a reserved channel (or reserved channel set). This enables the high bandwidth session to attain the necessary network performance from the WLAN.

In accordance with an example embodiment, at the time of network deployment, one 40 MHz wide channel (or multiple channels) at 5 GHz would be reserved for high bandwidth (such as Telepresence) applications. This channel would not be used by an AP operating in "normal" mode. All APs advertise a special SSID (Service Set Identifier) for high bandwidth applications (such as Telepresence), which can require special credentials for authentication. In this way, non-high bandwidth clients would not be able to associate with this SSID.

When a mobile device implementing a high bandwidth application such as Telepresence desires to start a WLAN session, the mobile device associates to a selected AP on the normal channel using the high bandwidth SSID. In order to improve the connectivity of the client, upon a successful association, the AP may send a channel switch announcement or Extended Channel Switch Announcement to move the high bandwidth device to the dedicated channel. Clients not using the high bandwidth SSID are sent an updated neighbor list of nearby APs with the non-high bandwidth SSID. The AP disassociates the non-high bandwidth clients and terminates the non-high bandwidth SSIDs. The non-high bandwidth clients roam to neighboring APs. The high bandwidth mobile device communicates with the selected AP on the dedicated channel using the high bandwidth SSID. In particular embodiments, the high bandwidth mobile device performs a second association with the selected AP on the dedicated channel, whereas in other embodiments the high bandwidth mobile device switches to the dedicated channel and immediately begins communicating on the second channel.

In an example embodiment, a Radio management module (or Radio Resource Manager or "RRM") for the WLAN system increases the transmit (Tx) power for neighboring APs, or modifies other channel parameters for neighboring APs such as Clear Channel Assessment (CCA) and/or Start of Packet (SOP), so that the neighboring APs will continue providing service to the area vacated by the selected AP. Since this channel is not used in normal operations, the current channel allocation plan is not impacted.

A problem that can arise is that some channels require a Dynamic Frequency Selection (DFS) check before they can be used. Accordingly, in an example embodiment a non-DFS channel is selected for the high bandwidth channel. In an another example embodiment, when the AP switches to the high bandwidth channel, it performs a 60 second DFS check (although this delays the start of the high bandwidth session, this may be acceptable). In still another example embodiment, all APs check the dedicated high bandwidth channel at a predefined time (such as midnight). This would meet the DFS check requirements for certain regulatory domains. Other example embodiments can include APs that periodically switch to the dedicated high bandwidth channel to perform background scanning and/or employ radar detection devices around the perimeter of the WLAN. In yet another example embodiment, instead of switching to a dedicated channel, the AP continues to use the current channel and in-range same-channel APs have their channels switched.

Another potential problem that can disrupt a WLAN is ping-ponging. For example, after connecting to a dedicated AP, a high bandwidth unit could see a second AP advertising the high bandwidth Service Set Identifier "SSID" (with better signal quality parameters such as signal strength), which could result in the high bandwidth unit attempting to roam to the second AP. This could occur even if the high bandwidth unit is static, due to changes in the channel such as fading or changes in transmit power or changes in medium usage. Moving to the second AP can cause disruption, because the second AP would potentially have to shed its clients, potentially do a DFS check, etc. Thus, in accordance with an example embodiment, the high bandwidth unit will be configured to be "sticky" after connection to an initial AP. In other words, it will not attempt to roam unless the power differences (in received signal strength) and clearness of the medium are dramatic, or the performance on the current dedicated AP is poor.

Another potential problem involves servicing mobile high bandwidth devices. High bandwidth units could be either static (not moving) or mobile (for example moving from a first static location to a second static location), while attempting to maintain a high bandwidth session. This could result in a trail of APs which incur overhead when shedding clients, shifting to the dedicated channel, etc. Accordingly, in an example embodiment, an AP could delay switching to the dedicated high bandwidth channel until it sees a high bandwidth client with a steady (or above a minimum) Received Signal Strength Indication (RSSI) for a predefined time period. While the high bandwidth device is moving, degraded performance on the shared channel could be an acceptable trade-off, with high quality service returning once the unit settles in its new location.

FIG. 1 illustrates an example of an apparatus 100 configured to implement an example embodiment. Apparatus 100 comprises a wireless transceiver 102 and channel selection channel selection logic 104 coupled to wireless transceiver 102. Channel selection logic 104 is operable to select an operating frequency for wireless transceiver 102. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software.

In an example embodiment, channel selection logic 104 is configured to reserve a dedicated channel for dedicated service having a special identifier. The special identifier may be a special basic service set identifier (BSSID), service set identifier (SSID) or any suitable identifier for informing wireless devices that dedicated service is available on the dedicated channel. In particular embodiments, the special identifier may also identify the types of service available on the dedicated channel, e.g. videoconferencing, or other channel characteristics such as bandwidth, quality of service, etc. The special identifier may be assigned by channel selection logic 104 or may be pre-programmed into channel selection logic 104.

Channel selection logic 104 is configured to advertise the dedicated service on a normal operating frequency via wireless transceiver 102. The normal channel is the channel which the wireless transceiver uses to communicate with wireless devices when not using the dedicated channel. For example, the normal channel for an access point would be the normal SSID that the access point uses to associate mobile clients. Thus, in an example embodiment, channel selection logic would advertise a first identifier associated with the first channel and a second identifier associated with the dedicated service on the normal frequency. This allows a mobile device on the normal operating frequency to ascertain that dedicated service is available on another channel without having to scan for the dedicated channel; and also for all APs to advertise dedicated service without actually transmitting on a channel for the dedicated service.

Channel selection logic 104 is responsive to receiving a request to use the dedicated channel from a wireless device (not shown) via wireless transceiver 104 on the normal operating frequency to switch to the dedicated channel. Channel selection logic 104 establishes communications with the wireless device via wireless transceiver 102 on the dedicated channel.

In example embodiment, channel selection logic 104 is further configured to verify the wireless client is authorized to use the dedicated channel before establishing communications with the wireless device on the dedicated channel. For example, channel selection logic 104 may communicate with an external authentication/authorization server (not shown), Authentication Authorization and Accounting "AAA" server such as a RADIUS server to determine whether the client is authorized to use the dedicated channel. For example, access to the dedicated channel may be limited to videoconferencing devices or other devices having high bandwidth requirements.

In an example embodiment, channel selection logic 104 is further configured to send a signal to other clients (not shown) having previously established communications instructing the other clients to associate with another access point. For example, a deauthentication frame or a disassociation frame may be sent to the other clients. As another example a frame instructing the clients to roam to another access point may be sent. In particular embodiments, the signal sent to the other clients comprises a list of neighboring access points that can provide service.

In an example embodiment, channel selection logic 104 is responsive to finishing communications with the wireless device on the dedicated channel and to have wireless transceiver 102 move to the normal operating channel and resume advertising the ability to provide normal service on the normal operating frequency and resume advertising dedicated service on the normal operating frequency.

In an example embodiment, channel selection logic 104 is configured to have wireless transceiver 102 listen to the dedicated channel for a predetermined time period before operating on the dedicated channel. For example, channel selection logic 104 may listen to the channel to comply with dynamic frequency selection (DFS) requirements for certain channels in certain regulatory domains. For example, due to regulatory requirements, some channels cannot be used if radar signals are using the channel. In an example embodiment, channel selection logic 104 listens to the dedicated channel for sixty seconds before using the channel. If no potential radar signals are detected within sixty seconds, communications are established on the dedicated channel.

In another example embodiment, channel selection logic 104 is configured to have wireless transceiver 102 periodically scan the dedicated channel for potential radar signals while operating on the normal operating frequency. For example, channel selection logic 104 may send a signal to clients on the normal operating channel that it will be unavailable for a time period, switch to the dedicated channel and listen for potential radar seconds for the time period, and then switch back to the normal operating frequency and continue operating on the normal operating frequency.

In another example embodiment, channel selection logic 104 is in communication with an external device or module that scans the dedicated channel for radar signals. Channel selection logic 104 switches to the dedicated channel responsive to receiving data from the external device indicating that the dedicated channel is free of potential radar signals. For example, a dedicated radar detection device may be disposed on the perimeter of a network. If potential radar signals are detected, the radar detection device can signal channel selection logic 104 that the dedicated channel is unavailable.

In an example embodiment, if a potential radar signal is detected on the dedicated channel, channel selection logic 104 selects a second channel to be the dedicated channel. Any suitable technique may be employed to detect radar on the dedicated channel including the aforementioned techniques described herein.

In an example embodiment, wireless transceiver 102 comprises a plurality of wireless transceivers. For example, a first wireless transceiver is configured to operate on the normal operating frequency while a second wireless transceiver is configured to operate on the dedicated channel. Upon associating a client to the service set identifier associated with the dedicated channel, channel selection logic 104 instructs the client to switch to the second channel. In accordance with an example embodiment, channel selection logic 104 may have the second transceiver power off to save power when no clients are on the second channel. In accordance with another example embodiment, channel selection logic 104 may employ the second transceiver to service clients while the dedicated channel is not in use.

It should be noted that the preceding description referred to a normal operating frequency and a dedicated channel. Those skilled in the art should readily appreciate that this was merely for ease of illustration as the principles of the example embodiments described herein can be employed to systems which employ multiple channels, for example a plurality of normal operating frequencies, zero or more service set identifiers per operating channel, a plurality of 20 or 40 MHz dedicated channels at 2.4 or 5 GHz, and a plurality of dedicated service advertisements (for instance if multiple dedicated services are being offered). For example, a first client associating with the special SSID may be directed to a first dedicated while a second client associating with the second special SSID may be directed to a second dedicated channel. If no dedicated channels are available, then the client's request may be denied or the best/freest non-dedicated channel may be used instead (and nearby, same-channel APs may be switched to other channels). For example, if only one dedicated channel is available and in use, a second client's request to associate with the special SSID may be denied until the channel becomes available.

Figure 2A:
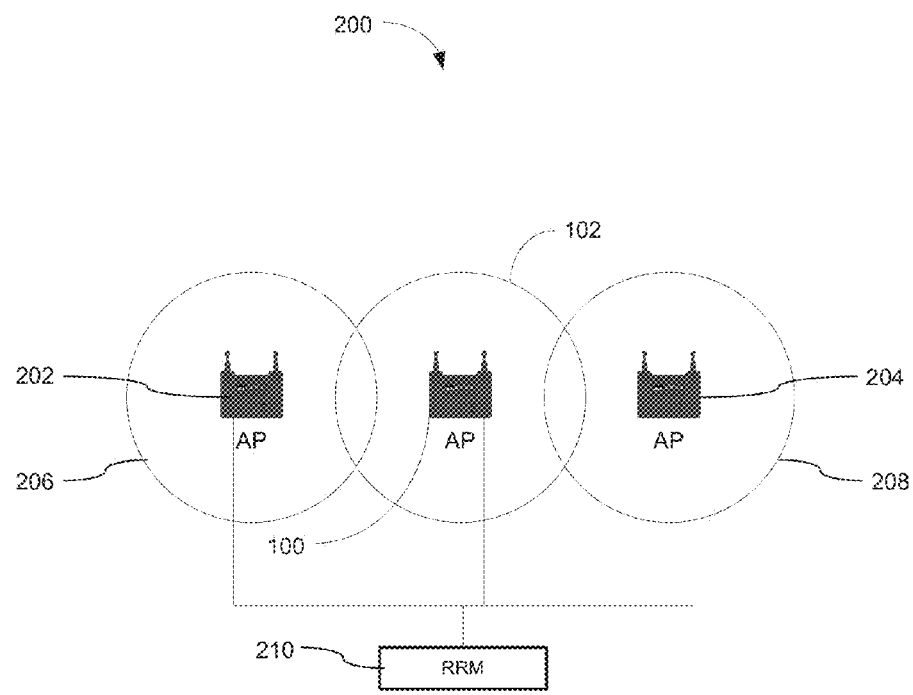
FIG. 2A illustrates an example configuration of a wireless network with a first access point operating at the normal operating frequency.

FIG. 2A illustrates an example configuration of a wireless network 200 with a first access point (AP) 100 operating at the normal operating frequency. AP 100 can be suitably configured employing any of the example embodiments described herein for apparatus 100 described in FIG. 1. AP 100 provides service over a first coverage area 102, while APs 202 and 204 provide coverage in areas 206 and 208 respectively. APs 100, 202 and 204 are coupled to a Radio Resource Manager (RRM) 210, which is operable to control the operation of APs 100, 202, and 204. For example, RRM 210 may send parameters to APs 100, 202, and 204 to control the size of coverage areas 102, 206, and 208 respectively.

Figure 2B:
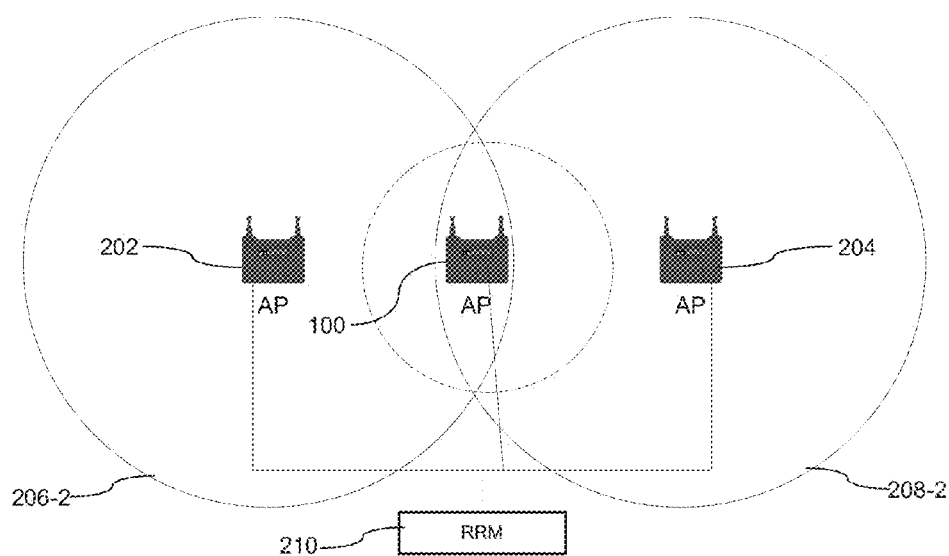
FIG. 2B illustrates an example configuration of the wireless network in FIG. 2A where the first access point is operating on the dedicated channel.

FIG. 2B illustrates an example configuration of the wireless network in FIG. 2A where AP 100 is operating on the dedicated channel (where the dedicated channel is a separate and distinct channel from the normal operating frequency). For example, if AP 100 associates a client that is requesting service on the dedicated channel, AP 100 would then switch to the dedicated channel. RRM 210 would then communicate new configuration parameters to APs 202, 204 so that they alter their coverage areas 206-2, 208-2 respectively so that they cover the area that AP 100 was providing service.

In an example embodiment, AP 100 may direct clients remaining on the normal operating frequency to roam to one of APs 202, 204. In another example embodiment, APs 202, 204 operate on a different frequency than the normal operating frequency of AP 100. Optionally, AP 100 may provide the operating frequencies of APs 202, 204 to the roaming clients.

In an example embodiment, RRM 210 has APs 202, 204 change their power settings to achieve coverage areas 206-2 and 208-2 respectively. In another example embodiment, RRM 210 changes the clear channel assessment (CCA) and/or Start of Packet (SOP) thresholds of APs 202, 204 to achieve coverage areas 206, 208 respectively. In still other example embodiments, RRM 210 may have APs 202, 204 change a combination of power setting, CCA, and/or SOP thresholds to achieve coverage areas 206-2 and 208-2 respectively.

Figure 3:
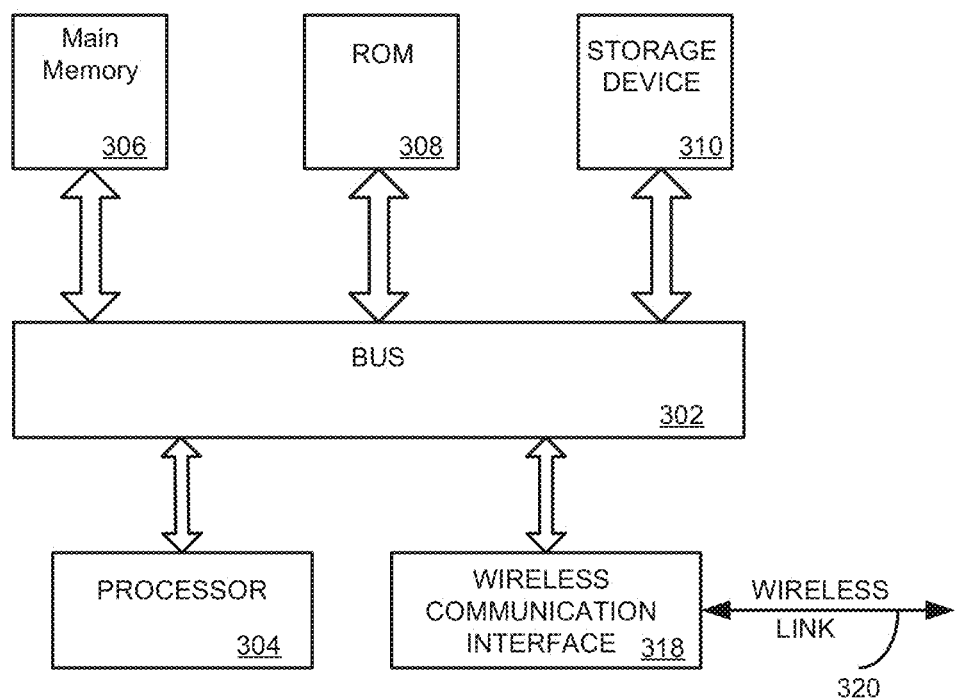
FIG. 3 illustrates an example of a computer system upon which an example embodiment may be implemented.

FIG. 3 illustrates an example of a computer system 300 upon which an example embodiment may be implemented. Computer system 300 is suitable for implementing inter alia channel selection logic 104 described in FIG. 1 and/or for implementing the functionality of RRM 210 described in FIG. 2.

Computer system 300 includes a bus 302 or other communication mechanism for communicating information and a processor 304 coupled with bus 302 for processing information. Computer system 300 also includes a main memory 306, such as random access memory (RAM) or other dynamic storage device coupled to bus 302 for storing information and instructions to be executed by processor 304. Main memory 306 also may be used for storing a temporary variable or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

An aspect of the example embodiment is related to the use of computer system 300 for providing dynamically dedicated wireless local area network service for high definition video teleconferencing. According to an example embodiment, dynamically dedicated wireless local area network service for high definition video teleconferencing is provided by computer system 300 in response to processor 304 executing one or more sequences of one or more instructions contained in main memory 306. Such instructions may be read into main memory 306 from another computer-readable medium, such as storage device 310. Execution of the sequence of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 304 for execution. Such a medium may take many forms, including but not limited to non-volatile media and volatile media. Non-volatile media include for example optical or magnetic disks, such as storage device 310. Volatile media include dynamic memory such as main memory 306. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Computer system 300 also includes a wireless communication interface 318 coupled to bus 302. Communication interface 318 provides a two-way data communication coupling computer system 300 to a wireless link 320 enabling computer system 300 to wirelessly communicate with other devices. For example, wireless communication interface 318 can be employed by processor 304 to send and receive messages from other wireless devices as described herein. For example, processor 304 can advertise on a first channel a SSID for the first channel as well as an SSID for the second channel. Processor 304 can communicate with a wireless device requesting access to the dedicated channel via wireless communication interface 318 and implement any of the techniques described herein.

Figure 4:
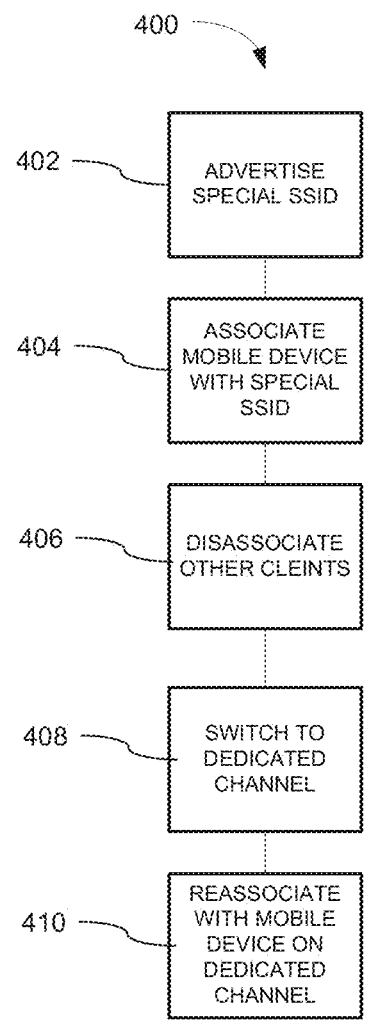
FIG. 4 illustrates an example methodology for providing dedicated service for high bandwidth applications.

In view of the foregoing structural and functional features described above, a methodology 400 in accordance with an example embodiment will be better appreciated with reference to FIG. 4. While, for purposes of simplicity of explanation, the methodology of FIG. 4 is shown and described as executing serially, it is to be understood and appreciated that the example embodiment is not limited by the illustrated order, as some aspects could occur in different orders and/or concurrently with other aspects from that shown and described herein. Moreover, not all illustrated features may be required to implement a methodology in accordance with an aspect the example embodiment. The methodology described herein is suitably adapted to be implemented in hardware, software, or a combination thereof. In an example embodiment, methodology 400 is implemented by one or more access points (APs) that are part of a wireless local area network (WLAN). An aspect of this example embodiment is that it allows a channel or a set of channels to be reserved for special applications, such as applications requiring a high amount of bandwidth like videoconferencing, e.g. Telepresence. For purposes of illustration, the following example will describe communications from the perspective of an access point (AP); although those skilled in the art can readily appreciate that methodology 400 can be implemented on any wireless device.

At 402, a special identifier, such as a Service Set Identifier (SSID), is broadcast advertising the dedicated service. In an example embodiment, an AP sends beacons or other types of frames advertising its normal SSID as well as the SSID (or special SSID) for the reserved (dedicated or second) channel on its normal operating channel. This allows clients on the AP's normal channel to determine that the AP is capable of providing service on the reserved channel.

At 404, an association request is received for the service set identifier associated with the dedicated service provided on the reserved channel. In an example embodiment, the request is received via a wireless interface on a first channel. For example, the request, received from a wireless device, such as a mobile device, will be received specifying the request is for the SSID for the reserved channel (or the special SSID). In particular embodiments, the recipient of the request verifies whether the requestor is authorized to access the special SSID. For example, an AAA server may be queried. This allows use of the reserved channel to be restricted to certain devices. For example, if the reserved channel is designated for videoconferencing, the recipient of the request would verify that the requestor is in fact a videoconferencing client. If the client is not authorized to access the special SSID, then the request is denied.

In particular embodiments, access to the special SSID may be limited to a specific number of devices. For example, only one device at a time may be allowed to access the special SSID. In particular embodiments, a Radio Resource Manager (RRM, see for example FIG. 2) may be in communication with a group of APs that are within a close enough proximity with each other as to disrupt communications at a desired bandwidth. Thus, if a first client is associated with a first AP using the special SSID and a second client requests the SSID from an AP neighboring the first AP, the request may be denied if allowing the second client to access the SSID would interfere with the first client's communications. If, however, the second device is associating with an AP that is far enough away from the first AP, access may be granted.

At 406, communications with clients on the first channel are terminated. For example, once a request is granted by an AP to a client to use the special SSID, the AP signals its remaining clients on the normal (first) operating channel (or frequency) that it will no longer be available, which should trigger a roam by the remaining clients. Any suitable means for signaling the disassociation can be employed. Some examples are a deauthentication message, a disassociation message, and/or a predefined, such as for example a proprietary frame can be employed. In particular embodiments, an AP may send a list of neighboring APs (and optionally their operating frequencies) to the remaining clients.

At 408, the recipient of the request switches to the second channel. In single transceiver embodiments, the wireless transceiver changes its operating frequency. In multi-transceiver embodiments, operating switches to the transceiver associated with the reserved channel. In particular embodiments the transceiver for the first (normal) frequency may be switched off or to a low power state.

In an example embodiment, the reserved channel is scanned before being used. For example, the reserved channel may be scanned for potential radar signals to comply with Dynamic Frequency Selection (DFS) regulatory requirements. In an example embodiment, the second channel may be scanned at a predefined time period (for example at midnight in Europe). In another example embodiment, the second channel may be scanned prior to use, such as for sixty seconds upon switching to the second channel, and/or background scanning may be performed while operating on the first (normal) operating channel.

In an example embodiment, if radar, or any other signals which may preclude use of the reserved channel, is detected on the reserved channel, a third channel is selected as the reserved (dedicated channel). A signal is sent to the requestor notifying the requestor to switch to the third channel.

At 410, the client is associated with the service set identifier associated with the reserved channel on the reserved channel. This enables the recipient to determine it is communicating with the correct party and that the party is ready to communicate on the reserved channel. For example, if the client is for a videoconferencing application, upon successfully associating the client on the reserved channel, videoconferencing begins.

In an example embodiment, upon completion (or termination) of communications on the reserved channel, the AP returns to the first channel. Upon returning to the first channel, the AP advertises the service set identifier associated with the first channel and the service set identifier associated with dedicated service. This allows the AP to resume normal operation on the first frequency. Methodology 400 may be repeated as often as needed. For example, if after returning to the first frequency the AP encounters another mobile device (or even the same device) requesting the reserved channel, the aforementioned actions as described herein may be repeated.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. Logic encoded in a non-transitory, tangible computer readable medium for execution by a processor, and when executed by the processor operable to:
   select an operating frequency for a wireless transceiver of a first access point to establish a first non-dedicated channel;
   reserve a second dedicated channel for a dedicated service having a special identifier;
   control the wireless transceiver to advertise the dedicated service on the first channel;
   switch from the first channel to the second channel and establish communications with a wireless device on the second channel responsive to receiving a request from the wireless device via the wireless transceiver on the first channel to use the dedicated service; and
   upon determining to switch to the second channel, instructing other clients having previously established communications with the first access point using the first channel to disassociate with the first access point and providing a list of suitable access points to the other clients.

2. The logic according to claim 1, further operable to verify the wireless device is authorized to use the dedicated service before establishing communications with the wireless device on the second channel.

3. The logic according to claim 1, further operable to return to the first channel responsive to finishing communications with the wireless device on the second channel.

4. The logic according to claim 1, further operable to establish communications with the wireless device on the second channel by associating with the wireless device on the second channel.

5. The logic according to claim 1, further operable to send and receive data via a second wireless transceiver, wherein the second wireless transceiver is configured to operate on the second channel; and
   provide the dedicated service via the second wireless transceiver to communicate with the wireless device on the second channel.

6. The logic according to claim 1, further operable to scan the second channel for potential radar signals; and
   select a third channel responsive to determining potential radar signals have been received on the second channel.

7. The logic according to claim 1, further operable to delay switching to the second channel until observing the wireless device has one of a group consisting of a steady Received Signal Strength Indication for a predetermined time period and a Received Signal Strength Indication above a minimum threshold for the predetermined time period.

8. The logic according to claim 1, further operable to:
   employ a second wireless transceiver to communicate on the second channel; and
   establish communications with a second wireless device on the second channel responsive to receiving a second request from the second wireless device via the wireless transceiver and the first channel.

9. The logic according to claim 1, further operable to limit the access to the second channel to a predefined number of devices.

10. A method comprising:
   selecting an operating frequency for a wireless transceiver of a first access point to establish a first non-dedicated channel;
   reserving a second dedicated channel for a dedicated service having a special identifier;
   controlling the wireless transceiver to advertise the dedicated service on the first channel;
   switching from the first channel to the second channel and establishing communications with a wireless client device on the second channel responsive to receiving a request from the wireless device via the wireless transceiver on the first channel to use the dedicated service; and
   upon determining to switch to the second channel, instructing other clients having previously established communications with the first access point using the first channel to disassociate with the first access point and providing a list of suitable access points to the other clients.

11. The method according to claim 10, further comprising verifying the wireless client device is authorized to use the dedicated service before establishing communications with the wireless client device on the second channel.

12. The method according to claim 10, further comprising returning to the first channel responsive to finishing communications with the wireless client device on the second channel.

13. The method according to claim 10, further comprising establishing communications with the wireless client device on the second channel by associating with the wireless client device on the second channel.

14. The method according to claim 10, further comprising:
sending and receiving data, via a second wireless transceiver, wherein the second wireless transceiver is configured to operate on the second channel; and
providing the dedicated service via the second wireless transceiver to communicate with the wireless client device on the second channel.

15. The method according to claim 10, further comprising:
scanning the second channel for potential radar signals; and
selecting a third channel responsive to determining potential radar signals have been received on the second channel.

16. The method according to claim 10, further comprising delaying switching to the second channel until observing the wireless client device has one of a group consisting of a steady Received Signal Strength Indication for a predetermined time period and a Received Signal Strength Indication above a minimum threshold for the predetermined time period.

17. The method according to claim 10, further comprising:
employing a second wireless transceiver to communicate on the second channel; and
establishing communications with a second wireless client device on the second channel responsive to receiving a second request from the second wireless client device via the wireless transceiver on the first channel.

18. The method according to claim 10, further comprising limiting access to the second channel to a predefined number of wireless client devices.

19. Logic encoded in a non-transitory, tangible computer readable medium for execution by a processor, and when executed by a processor operable to:
advertise, on a first channel, a first service set identifier associated with the first channel;
advertise, on the first channel, a second service set identifier associated with a second channel associated with a dedicated service;
receive an association request from a first client for the second service set identifier associated with the second channel;
associate the first client to the second service set identifier associated with the second channel;
switch from the first channel to the second channel responsive to associating the first client to the second service set identifier associated with the second channel associated with the dedicated service;
establish communications with the first client on the second channel; and
upon determining to switch to the second channel, instructing other clients having previously established communications with the first channel to disconnect from the first channel and send data representative of neighboring access points to the other clients.

20. The logic according to claim 19, wherein instructing the other clients to disconnect form the first channel comprises:
sending a frame to the other clients on the first channel to terminate communications with the other clients.

21. The logic according to claim 19, the associating further operable to verify the first client is authorized to access the service set identifier associated with the second channel.

22. The logic according to claim 19, further operable to perform a radar detection check on the second channel prior to establishing communications with the first client on the second channel.

23. The logic according to claim 22, further operable to:
send a message to the first client to switch to a third channel responsive to detecting radar in the second channel; and
switch to the third channel after sending the message to the first client to switch to the third channel.

24. The logic according to claim 19, further operable to limit access to the second channel to one device at a time.

25. The logic according to claim 1, further operable to terminate the transmission of SSIDs associated with the first channel after the other clients have been instructed to disassociate with the first access point.

* * * * *